United States Patent [19]

Wilcox et al.

[11] 4,086,939
[45] May 2, 1978

[54] COUPLING ASSEMBLY

[75] Inventors: Wayne E. Wilcox, Union City; Frank L. Foster, Corry, both of Pa.

[73] Assignee: Snap-Tite, Inc., Union City, Pa.

[21] Appl. No.: 720,243

[22] Filed: Sep. 3, 1976

[51] Int. Cl.² ............................................. F16L 37/28
[52] U.S. Cl. .............................. 137/614.03; 251/149.6
[58] Field of Search ....................... 137/614.03, 614.04; 251/149.6

[56] References Cited

U.S. PATENT DOCUMENTS 2,545,796  3/1951  Scheiwer .......................... 137/614.04

Primary Examiner—Robert G. Nilson

[57] ABSTRACT

A coupling assembly for fluid-flow systems is disclosed which includes both a coupler and a nipple. The mating or sealing surfaces of the coupler and nipple are protected from dirt and other deleterious substances by corresponding moveable covers. The moveable covers not only protect the mating surfaces but present flush faces for the coupler and nipple which are easily cleaned. The construction of the coupling assembly is designed so that connection of the coupler and nipple may be accomplished by using only one hand. The coupler is designed so as to render the adapter and the valve a one-piece structure.

15 Claims, 6 Drawing Figures

COUPLING ASSEMBLY

BACKGROUND OF THE INVENTION

Fluid systems are often an important power source for manufacturing, material handling, mobile equipment and other segments of industry. Fluid power is very useful in operating machines and tools, material handling, for lifting, moving, clamping or other operations. While various uses are well known in the field, the applicability of fluid power grows each day.

Of course, in order to put the fluid power to useful work, the fluid msut be transported to the machine or tool. The transporting of the fluid may be accomplished through a system of permanent piping. But often, flexibility is required, or at least desired. Such may be the case either where free movement of the tool is required during use, or where relocation of the machine or tool is necessary between uses. In these cases, flexible hose, such as rubber or other materials, may be utilized to connect the machine or tool to the power source.

Certainly, it may be seen that it would be advantageous to be capable of adding or subtracting tools, machines or additional pipes and hoses into the system without the necessity of shutting down the fluid power supply. Again this is a problem which has been recognized prior hereto and solved through the use of a device which has come to be known as a quick-disconnect.

The idea behind the quick disconnect is to provide a simple snap-in, locking, sealing engagment between portions of the pressure system. The quick disconnect consists of two portions, a coupler and a nipple. One of the two portions includes a spring biased valve which ordinarily blocks the fluid flow. This portion, with the valve, is installed in the pressure side of the system and thus blocks fluid flow unless the valve has been opened by interconnecting the two portions.

The remaining portion of the quick disconnect (the nipple) is installed on the tool, machine or additional line side of the system. This portion presents an unobstructed flow to the fluid once the portions are interconnected.

The interconnection of the coupler and the nipple is obtained by inserting the free end of the nipple into the open face of the coupler. The outside of the nipple and an inner surface of the coupler are mating surfaces which sealingly engage when properly aligned. Once the mating surfaces are engaged, the coupler and nipple are locked together by a sliding cover on a coupler having detent balls which fall into a circumferential groove in the nipple.

The present state of quick disconnect is such that first, the sliding cover on the coupler must be held back while the nipple is inserted thus requiring two hands to connect. Second, the sealing surfaces of both the coupler and nipple are exposed and thus susceptible to dirt, grease and other undesirable substances.

SUMMARY OF THE INVENTION

It is a general object of this invention to provide a coupling assembly for fluid flow systems and, more particularly, to provide a new and unique coupler and nipple disconnect for fluid pressure lines.

Another object of this invention is to provide a new and improved coupling assembly for fluid pressure lines which requires only one hand to interconnect and disconnect the assembly.

Still other objects of this invention are to provide a new and improved coupling assembly for fluid pressure lines which includes cover means for the sealing surfaces on both the coupler and nipple portions to prevent dirt from accumulating on the sealing surfaces and which presents flush faces on the open ends of both the coupler and the nipple to resist accumulation of dirt.

Yet another object of this invention is to provide a new and improved coupling assembly for fluid flow systems which utilizes a coupler portion having a flow valve unitary therewith.

These and other objects and advantages of this invention will appear from the following description of the preferred embodiment, reference being made to the accompanying drawings.

BRIEF DESCRIPTION OF THE DRAWINGS

FIG. 4 is a cross sectional view of the coupler taken along line 4—4 of FIG. 1a.

DETAILED DESCRIPTION OF THE PREFERRED EMBODIMENT

The prior art coupling assemblies for fluid systems have generally included coupler and nipple portions. It has become customary to refer to the portions of practically all coupling assemblies by sex, ie. male and female portions. In the prior art, the coupler is considered the female portion while the nipple is the male portion. Further, the coupler includes a spring biased valve and corresponding valve seat to block the flow of fluid under normal conditions. The insertion of the nipple, which has an open chamber axially therethrough, into the coupler opens the valve and renders the fluid flow unrestricted.

Figure 1A:
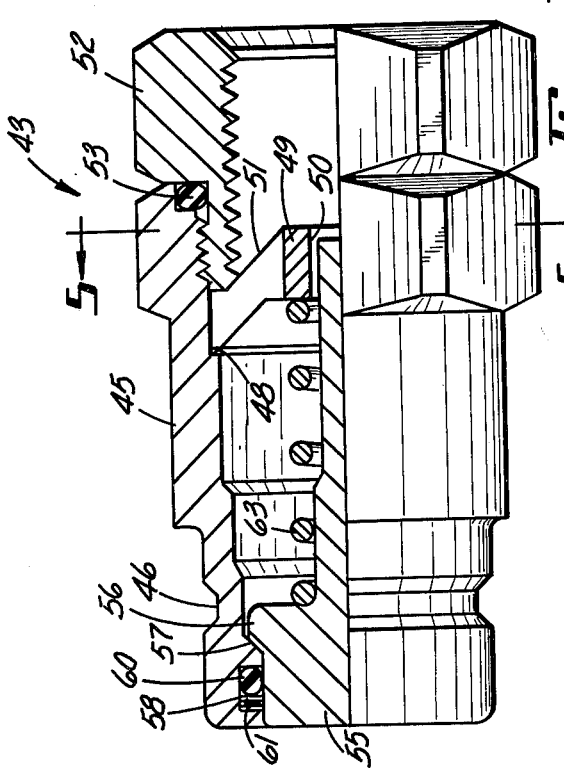
FIG. 1a is a partial cross sectional view of the coupler of the invention along its axial length.

FIG. 1a illustrates the coupler shown generally at 10 of the present coupling assembly invention. The major component of the coupler 10 is the coupler valve body 12. The left end of the coupler valve body 12 (as viewed in FIG. 1a) is provided with appropriate means such as threads (shown in the figures) for attaching the coupler 10 to a tool, machine or fluid line. The right end of the coupler valve body 12 (as viewed in FIG. 1a) is a flat, full, relatively smooth face 13. The remaining exterior surface of the coupler valve body 12 is machined or cast so as to accomodate the remaining components of the coupler 10 as will be described hereafter.

The coupler valve body 12 is further designed so that a cavity extends from the left side (as viewed) axially into the body almost to the right side, but not piercing the smooth face 13. At the right side of the coupler valve body 12 a series of apertures 15 are radially spaced around the circumferential surface. Thus, the coupler valve body includes integral therewith the valve.

A sliding seal or sliding sleeve means 17 is the next component of the coupler 10 and consists of a cylindrical shell just slightly larger in dimensions than the right side of the coupler valve body 12. The sliding seal 17 has a circumferential ring 18 extending radially from the outer diameter thereof. The purpose of the sliding seal 17 is to allow controlled release of fluid from the coupler valve body 12 through the apertures 15. For this reason, an O-ring 19 is positioned at either side of the sliding seal 17 between the seal and the coupler valve body 12. Appropriate arrangements for retaining the O-rings 19 are provided in the coupler valve body 12.

Since the O-rings 19 are arranged to be on either side of the apertures 15, with the sliding seal or sleeve means 17 moved fully forward, there is no fluid flow through the coupler 10. A back-up ring 20 is also utilized at the left side (as shown) of the sliding seal for the purpose of assuring sealing particularly when fluid flow is occuring through the interconnected coupling assembly.

The sliding seal or sleeve means 17 is biased, by means of a spring 22, to remain normally in sealing engagement over the apertures 15. The spring 22 is preferably a cylindrical coil spring positioned between a portion of the coupler valve body 12 and the circumferential ring 18.

A sliding cover 24 is the next component of the coupler 10. The sliding cover 24 is a cylindrical shell and is positioned over the sliding seal or sleeve means 17 to the right of the circumferential ring 18. A spring 25 is positioned between the circumferential ring 18 and the inside of the sliding cover 24 to constantly force the cover 24 outward (to the right as shown). The sliding cover 24 is constructed so that a flat face 26 is presented to the right.

Both the sliding seal or sleeve means 17 and the sliding cover 24 are restrained from excess forward movement (to the right as shown) by a body cover 27 which is a cylindrical shell fitting over the cover 24, seal 17 and a portion of the body 12. The body cover 27 is secured to the coupler valve body 12 by any suitable means such as corresponding threads. The body cover 27 presents a forward stop 28 for the sliding cover 24 and a forward stop 29 for the sliding seal 17.

With the body cover 27 in place the surface 13 of the valve body 12, the forward edge of the sliding seal or sleeve means 17 and the face 26 of the sliding cover 24 present a relatively flat smooth face which is easily kept clean to aid in restraining dirt from entering the coupler 12 and interfering with the seal 17 and O-rings 19.

Figure 4:
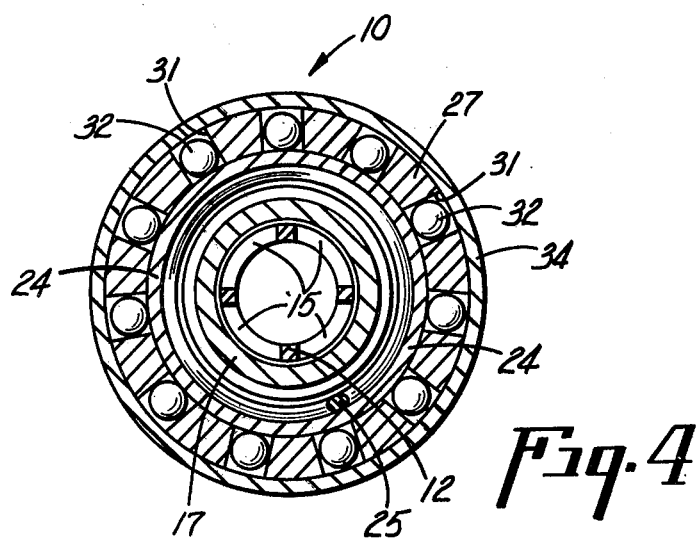

The body cover 27 has a series of apertures 31 near the forward end (right side as shown). Each of the apertures 31 has a spherical metal ball 32 therein. Although eleven apertures 31 and spherical balls 32 are preferred and shown in FIG. 4, the actual number is not important and either more or less may be utilized.

The spherical balls 32, when positioned in the apertures 31, rest on the sliding cover 24, which is designed to have a relatively smooth outer cylindrical surface. The spherical balls 32 are maintained in place by a locking sleeve 34 which is a cylindrical shell of a slightly larger diameter than the body cover 27. The locking sleeve 34 has a circumferential groove 35 at the inside of the forward edge (right side) which serves to allow the spherical balls 32 to move outward.

A spring 36 is positioned between a portion of the body cover 27 and a portion of the locking sleeve 34 to constantly force the locking sleeve forward (to the right). The back and forth movement of the locking sleeve 34 is restrained at either extreme so that the spherical balls are not released. Forward movement (to the right) is restrained by a snap-ring 38 which is inserted into a circumferential groove near the edge of the body cover 27. Rearward movement (to the left) is restrained by a spherical ball 39 permanently set into the body cover 27. The spherical ball 39 extends above the surface of the body cover 27 and must be lined up with a corresponding slot 40 provided in the rear edge of the locking sleeve 34. The ball 39 provides a means of locking the sleeve 34 to prevent it from accidentally moving rearward and allowing the unconnecting of the coupler 10 and nipple. When the coupler and nipple have been interlocked the sleeve 34 is moved forward until the spherical ball 39 is completely clear of the slot 40 and beyond the edge of the sleeve. The sleeve may then be rotated causing the spherical ball to be misaligned with the slot 40 so that the sleeve may not move back. To open, the connection of the process would have to be reversed.

Figure 1B:
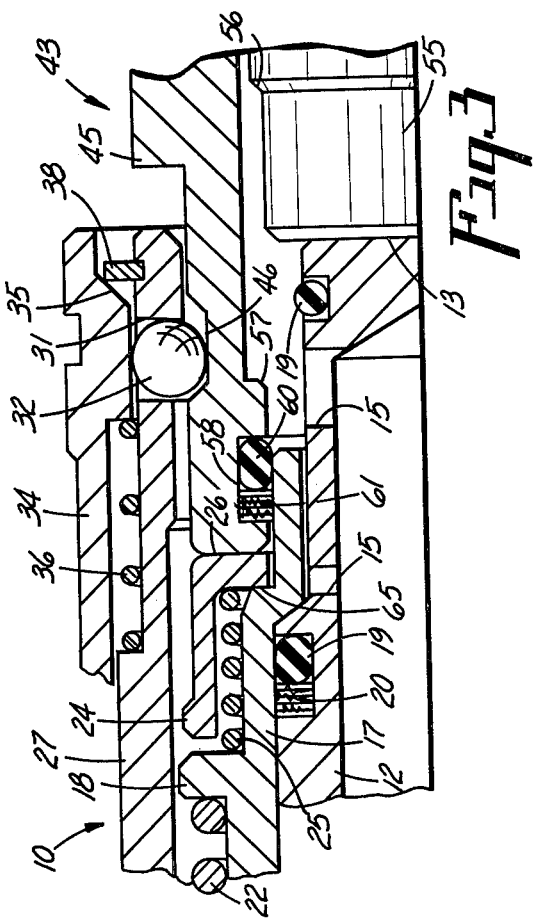
FIG. 1b is a partial cross sectional view of the nipple of the invention along its axial length.

FIG. 1b illustrates the nipple shown generally at 43 of the coupling assembly. The major component of the nipple 43 is a nipple body 45 which is generally cylindrical. The nipple body 45 has an outside diameter at the forward edge (left as shown) just slightly less then the inside diameter of the body cover 27 of the coupler 10. Near the forward edge of the nipple body 45 is a circumferential groove 46 for a purpose to be explained subsequent hereto.

Figure 5:
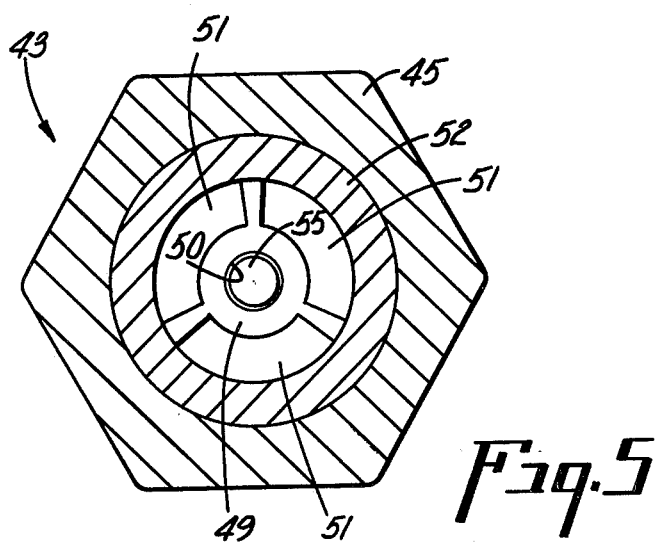
FIG. 5 is a cross sectional view of the nipple taken along line 5—5 of FIG. 1b.

The nipple body 45 has a hollow center extending completely axially therethrough. Near the rearward edge (right as shown) of the inside of the nipple body 45 a seat 48 is provided into which a valve guide 49 is removably inserted. The center of the valve guide 49 has an aperture 50 therethrough. The valve guide has openings 51 therethrough spaced about a circle having a radius slightly larger than the aperture 50 as shown in FIG. 5. The valve guide 49 is secured in place by an adapter 52 which is connected to the nipple body 45 by corresponding threads or other suitable means. An O-ring 53 is positioned between the nipple body 45 and the adapter 52 to provide a completely sealed, leak-proof connection. The adapter 52 is provided with appropriate means, such as threads, for attaching the nipple 43 to a machine, tool or fluid line.

A nipple valve 55 is positioned within the nipple body 45 at the extreme forward edge (to the left as shown). The nipple valve 55 has a circumferential ridge 56 which makes a retaining contact with a flange 57 on the nipple body 45 when the nipple valve is in its closed position. A circumferential groove 58 is provided on the inside of the leading edge of the nipple body 45. An O-ring 60 and back-up ring 61 are positioned within the circumferential groove 58 and cause a fluid tight seal between the nipple body 45 and the nipple valve 55 when the valve 55 is in its closed position. The forward face of the nipple valve 55 (left as shown) is approximately equal in diameter to the face 13 of the valve body 12 along with the edge of the sliding seal 17.

The nipple valve 55 has a long cylindrical stem which extends through the aperture 50 in the valve guide 49. A spring 63, which is a circular coil, is positioned between the nipple valve 55 and the valve guide 49. Pressure from the spring 63 maintains the circumferential ridge 56 against the flange 57 which is the closed position for the nipple valve 55.

The forward edge of the nipple body 45 and the forward face of the nipple valve 55 present a relatively continuous smooth surface which is easily kept clean. This, of course, is likewise true for the coupler 10 of the coupling assembly as noted above. Since both the coupler 10 and the nipple 43 have sealing valves within them. Either may be utilized on the pressure side of the fluid lines.

With the components of the coupling assembly of this invention as described above, the actual operation and use of the assembly may be understood.

Figure 2:
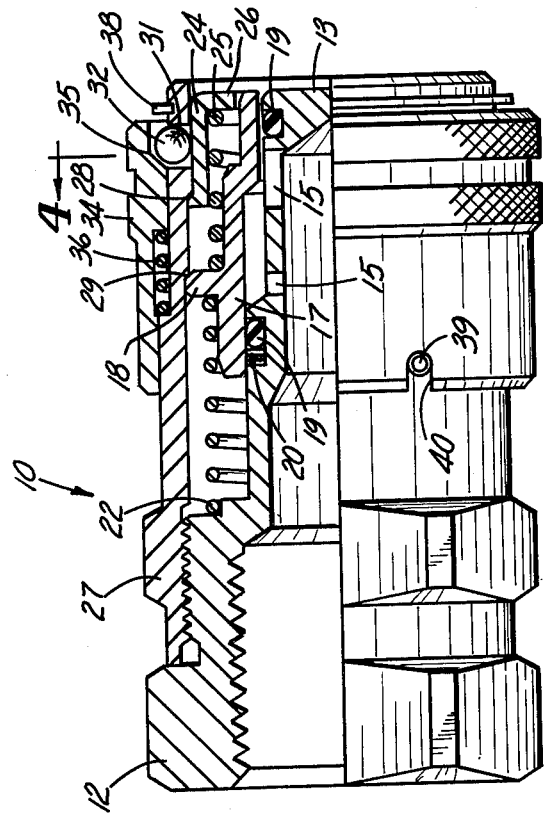
FIG. 2 is a cross sectional view of the coupler and nipple of the invention partially interconnected along their common axial length.

FIG. 2 illustrates the coupler 10 and nipple 43 partially interconnected. The interconnection is accomplished by moving the coupler 10 and nipple 43 together (as viewed in FIGS. 1a and 1b, along the same axial line until the flush faces of the two meet. As the two portions continue moving together, the nipple body 45 slides into the body cover 27 pushing the sliding cover 24 into the coupler 10. At the same time, the coupler valve body 12 and the sliding seal 17 engage the nipple valve 55 and push it into the nipple 43.

While most conventional quick-disconnect assemblies are referred to as male and female portions, the coupling assembly of the present invention does not exhibit characteristics allowing such referral. Although the nipple body 45 is inserted into the coupler 10, the coupler body 12 is simultaneously inserted into the nipple body 43. In this respect, neither the coupler 10 nor the nipple 43 can be said to be either the male or female portion. From this point of view, the coupling assembly of the present invention may be said to be sexless.

Continuing with the discussion of the interconnecting of the coupler 10 and nipple 43, the two portions are moved together until the nipple body 45 has moved the sliding cover 24 into the coupler 10 far enough to engage the sliding seal 17 at point 65. Precisely this point in the interconnection is depicted in FIG. 2. The O-ring 60 and back-up ring 61 of the nipple engage the sliding seal 17 since the nipple valve 55 has been pushed into the nipple. However, fluid is still stopped from exiting the nipple 43. The O-rings 19 and back-up ring 20 likewise still seal the coupler 10 from allowing fluid to exit.

In order to fully interconnect the coupling assembly, the coupler 10 and nipple 43 are moved further together. The coupler valve body 12 continues moving the nipple valve 55 into the nipple 43. Meanwhile, the nipple body 45 pushes the sliding cover 24 further into the coupler 10. Due to the fact that the sliding cover 24 has engaged the sliding seal 17 as noted above, when the nipple body 45 pushes the sliding cover 24, the sliding seal 17 also moves into the coupler 10.

As the sliding seal moves into the coupler, the apertures 15 are uncovered and fluid begins to rush through them, around the nipple valve 55 and through the openings 51 in the valve guide 49 (FIG. 5). Regardless of whether the pressure source is at the coupler 10 side or the nipple 43 side of the line, the fluid flow is open around the valve 55 and through the coupling assembly.

Figure 3:
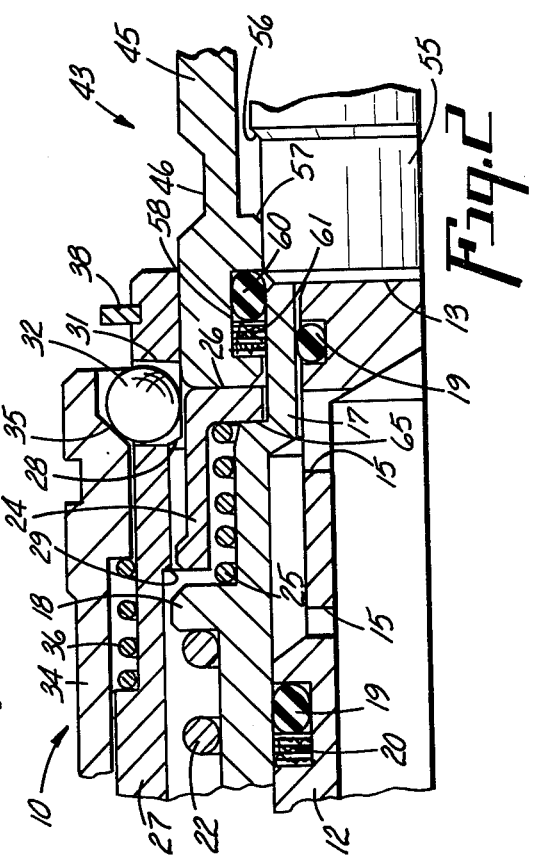
FIG. 3 is a cross sectional view of the coupler and nipple of the invention totally interconnected along their common axial length.

When the interconnection is complete, as shown in FIG. 3, the spherical balls 32 drop into the circumferential groove 46 on the nipple body 45. The spring 36 forces the locking sleeve 34 forward (to the right) and over the spherical balls 32 thus locking the coupler and nipple together. The snap-ring stops the forward movement of the locking sleeve 34.

The O-rings 60 and 19 and the back-up rings 61 and 20 assure that while the coupler and nipple are interconnected fluid flow will be through the proper channel and not out of the line between the component parts of the coupler.

In order to disconnect the coupler and nipple, the locking sleeve 34 need only be pulled back (to the left as shown) and the spring force and/or fluid pressure will force the coupler and nipple apart causing the spherical balls 32 to rise into the circumferential groove 35. If the sleeve 34 has been locked in place, as noted above, through the use of the spherical ball 39 and slot 40, the ball 39 and slot 40 will have to be alligned before the sleeve 34 can be pulled back to unconnect the coupler assembly.

When the coupler assembly is being interconnected, only one hand is needed to push either the nipple onto the coupler or the coupler onto the nipple.

This coupling assembly is primarily designed for use in hydraulic systems, however it may be adapted for pneumatic uses or in any system where fluid lines must be connected together quickly.

Modifications, changes and improvements to the preferred forms of the invention herein disclosed, described, and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

What is claimed is:

1. A coupler for connecting a fluid line under pressure comprising a body and valve, sliding sleeve means positioned relative to said valve, said sliding sleeve means selectively blocking fluid flow through the coupler, spring means biasing the sliding sleeve means to block fluid flow, sliding cover means positioned relative to said sliding sleeve means, second spring means biasing said sliding cover means to a position which is flush with a forward face of the coupler, said sliding cover means selectively activating the sliding seal means, and locking means positioned relative to said sliding cover means; said valve and body, sliding sleeve means, and sliding cover means presenting a relatively smooth, complete surface when fluid flow is blocked by said sliding sleeve means.

2. The coupler according to claim 1 in which the sliding cover means prevents dirt from entering the valve and sliding sleeve means when flush with the forward face and aids cleaning of the coupler.

3. The coupler according to claim 1 in which the locking means comprises a body cover secured to said body and valve, a locking sleeve over said body cover, a plurality of spherical balls positioned between said locking sleeve and said sliding cover means, spring means biasing said locking sleeve forward, and a locking ring secured to said body cover restraining excessive forward movement.

4. The coupler according to claim 3 in which said sliding cover means holds the spherical balls in an outward position to force the locking sleeve in a rearward position, and the sliding cover means maintains the spherical balls outward as a nipple is inserted into the coupler.

5. A coupler for connecting a fluid line comprising an annular body having first and second end portions, an annular flow member in said body and having first and second end portions, said first end portion of said annular flow member being connected to said first end portion of said body and extending axially with respect to said body and having a closed second end portion, said annular flow member having an axially extending internal flow passage and defining an annular chamber with said body, a fluid port extending radially through the wall of said annular flow member at said second end portion thereof, sliding sleeve means in said annular chamber and residing on and surrounding said second end portion of said annular flow member and being movable relative thereto between first and second positions, said sliding sleeve means in said first position blocking fluid flow through said port and in said second position permitting fluid flow through said port, spring means biasing said sliding sleeve means to said first position, sliding cover means in said annular chamber and residing on and surrounding said sliding sleeve means and being movable between first and second positions, second spring means biasing said sliding cover means to said first position thereof, movement of said sliding cover means to said second position against the biasing of said second spring means causing said sliding cover means to engage said sliding sleeve means to move said sliding sleeve means to its said second position thereby permitting fluid flow through said port, and locking means carried by said coupler to secure the same to a nipple member upon insertion of a nipple member into said coupler 6. A coupler as claimed in claim 5 wherein said closed second end portion of said annular flow member; an axial end on said sliding sleeve means and an axial end on said sliding cover means in said first positions of said sliding sleeve means and said sliding cover means; all lying substantially in the same plane.

7. A coupler as claimed in claim 5 wherein said locking means comprises a plurality of ball members residing in circumferentially spaced sockets in said second end portions of said annular body which ball members are movable between an outward inactive position and an inward locked position, said sliding cover means in its said first position engaging and holding said ball members in their said outward inactive position, a locking sleeve surrounding said annular body and movable between first and second positions to hold said ball members in their said inward locked position.

8. A coupler as claimed in claim 5 in combination with a nipple member, said nipple member comprising an annular end portion defining a flow passage and residing in said annular chamber to move said sliding sleeve means to its said second position.

9. A coupler as claimed in claim 8 wherein a valve member is located in said nipple member, said valve member being movable between first and second positions, a seal member on an internal surface of said annular end portion of said nipple member engaging said valve member in said first position of said valve member, said annular end portion of said nipple member when residing in said annular chamber engaging said sliding cover means which in turn engages said sliding sleeve means to move same to its said second position and said seal member engages an outer surface on said sliding sleeve means.

10. A coupler as claimed in claim 9 wherein said annular flow member engages and moves said valve member in said nipple member to its second position when said annular end portion of said nipple member resides in said annular chamber, and wall means on an external surface of said annular end portion of said nipple member to receive said locking means.

11. A coupler for connecting a fluid line comprising an annular body, an annular flow member in said body, said annular flow member having a flow passage, a fluid port extending through said annular flow member, sliding sleeve means movable relative to said fluid port and between first and second positions, said sliding sleeve means in said first position blocking fluid flow through said port and in said second position permitting fluid flow through said port, first means biasing said sliding sleeve means to said first position, sliding cover means movable relative to said sliding sleeve means and between first and second positions, second means biasing said sliding cover means to said first position thereof, movement of said sliding cover means to said second position against the biasing of said second means and movement of said sliding sleeve means to its said second position against the biasing of said first means permitting fluid flow through said port, and locking means carried by said coupler to secure the same to a nipple member upon insertion of a nipple member into said coupler.

12. A coupler as claimed in claim 11 wherein said locking means comprises a plurality of ball members residing in circumferentially spaced sockets in said annular body which ball members are movable between an outward inactive position and an inward locked position, said sliding cover means in its said first position engaging and holding said ball members in their said outward inactive position, a locking sleeve surrounding said annular body and movable between first and second positions to hold said ball members in their said inward locked position.

13. A coupler as claimed in claim 11 in combination with a nipple member, said nipple member comprising an end portion defining a flow passage and residing in said annular body of said coupler to move said sliding sleeve means to its said second position.

14. A coupler as claimed in claim 13 wherein a valve member is located in said nipple member, said valve member being movable between first and second positions, a seal member on an internal surface of said end portion of said nipple member engaging said valve member in said first position of said valve member, said end portion of said nipple member when residing in said body of said coupler engaging said sliding cover means which in turn engages said sliding sleeve means to move same to its said second position and said seal member engages an outer surface on said sliding sleeve means.

15. A coupler as claimed in claim 14 wherein said annular flow member engages and moves said valve member in said nipple member to its second position when said end portion of said nipple member resides in said body of said coupler, and wall means on an external surface of said end portion of said nipple member to receive said locking means.

* * * * *